United States Patent [19]

Pierce

[11] Patent Number: 5,201,898
[45] Date of Patent: Apr. 13, 1993

[54] ALIGNMENT MECHANISM FOR VEHICLE SUSPENSIONS
[75] Inventor: Wiliam C. Pierce, Muskegon, Mich.
[73] Assignee: Neway Corp., Muskegon, Mich.
[21] Appl. No.: 798,635
[22] Filed: Nov. 26, 1991
[51] Int. Cl.⁵ .............................................. B60G 7/02
[52] U.S. Cl. ..................................... 280/68; 280/661; 403/4
[58] Field of Search ................. 280/661, 713, 688; 403/3, 4

[56] References Cited

U.S. PATENT DOCUMENTS

Re. 30,308  7/1980  Masser .
3,960,388   7/1976  Strader et al.
4,595,216   7/1986  Ware .
4,921,271   5/1990  Berry ........................ 280/661

FOREIGN PATENT DOCUMENTS 3131107 12/1982 Fed. Rep. of Germany .

Primary Examiner—Karin L. Tyson
Attorney, Agent, or Firm—Varnum, Riddering, Schmidt & Howlett

[57] ABSTRACT

A vehicle suspension adjustment mechanism comprises pairs of plates having mutually complementary annular ribs and grooves for mutual interengagement to facilitate rotation of the pairs of plates with respect to each other. One of the pair has an enlarged semicircular aperture and the other of the pair has a smaller circular aperture of the same diameter as the trailing arm pivot bolt. The alignment position of the trailing arm relative to the vehicle frame is adjusted by rotating one of the plates relative to another of the plates.

21 Claims, 5 Drawing Sheets

ALIGNMENT MECHANISM FOR VEHICLE SUSPENSIONS

BACKGROUND OF THE INVENTION

1. Field of the Invention

This invention relates to trailing arm suspensions for wheeled vehicles for trailers, tractors, and other vehicles wherein the suspension includes a mechanism for fore or aft adjustment of the axle with respect to the vehicle frame in order to align the wheels.

2. State of the Prior Art

Proper axle alignment in road vehicles is important to prevent undue tire wear. Some common causes of improper wheel alignment in road vehicles include improper initial suspension system installation, accident damage, and impact or shock loads imposed on suspension components by potholes or other road irregularities.

Various wheel alignment adjustment mechanisms have been provided to permit adjustment of vehicle axles and wheels to proper alignment. For commercial vehicles, these mechanisms generally fall into two classes: (1) those which are adjustable as the suspension is being installed on the vehicle and then permanently fixed in the adjusted position by welding or the like, and (2) those which are adjustable at any time during and after installation, but which are held in the adjusted position mechanically.

The former classification of adjustment mechanisms is illustrated by U.S. Pat. No. 2,481,891 to Masser. In the Masser mechanism, elongated apertures in the form of slots are provided in the frame mounting brackets. A bolt is passed through the elongated apertures and through an aperture in the end of the trailing arm. The slots enable the trailing arm to be adjusted fore or aft relative to the vehicle frame. Plates are carried by the bolt and abut a raised lug on each side of the frame bracket. These plates are welded to the sides of the frame bracket after alignment, thereby fixing the adjustment mechanism in its aligned position. Once welded, the connection is no longer susceptible to tinkering or gradual loosening. If subsequent realignment is necessary, the welds must be removed.

The latter category includes more conventional adjustment mechanisms in suspension systems utilizing turn buckles, adjusting screws, eccentric pins, or the like to adjust the alignment of the axle relative to the frame. In each case, a clamp or equivalent device is used to lock the adjusting mechanism after the adjustment has been effected. These conventional systems have some undesirable characteristics: the mechanical locking devices were susceptible to loosening due to wear and usage with consequent deterioration of alignment; the mechanical locking devices were susceptible to the well-meaning tinkering of truck drivers or unqualified mechanics attempting alignment corrections with small hand tools by hit-or-miss methods; and, such mechanical locking devices generally require a plurality of parts thereby increasing the complexity, weight and cost of the suspension.

An improvement in a mechanically locked type of alignment mechanism can be seen in U.S. Pat. No. 4,595,216 issued to Ware on Jun. 17, 1986. In the Ware patent, a pair of plates on each side of the vehicle hanger bracket have mutual interengaging serrations to provide a plurality of discrete positions for alignment in the fore and aft directions. A secure, controlled adjustment of alignment is possible without the necessity of welding. One of the problems presented, however, is that alignment sometimes requires very minute adjustments which may be in a position other than the finite positions defined by the serrations.

It is desirable to provide an adjustment mechanism which will provide an infinite range of adjustment, but also provide an effective mechanism for realignment, if necessary, without destruction of parts, removing welds, etc. Such a mechanism should also be capable of producing a positive mechanical lock which is not susceptible to loosening and wear and tear, and not easily tampered with.

SUMMARY OF THE INVENTION

According to the invention, a mechanical adjustment mechanism is provided for aligning the axle and wheels of a vehicle. The vehicle is preferably of a type having a frame with ground-engaging wheels suspended by two trailing arms pivotably connected to the frame at opposite lateral sides for substantially coaxial swinging vertical movement. The axle which carries the wheels is connected to and between the trailing arms, and a spring is mounted in load transmitting relationship between the frame and the trailing arms. First connections are provided to pivotably connect the trailing arm to the frame and second connections are provided between the axle and the trailing arm. At least one of the connections has first and second plates movable relative to each other. The plates have mutually complementary formed surface portions cooperable for mechanical interengagement and aligned openings for adjusting the relative position of the axle with respect to the frame. At least one connection also has a pin extending through the aligned openings for selectively holding the plates together in the aligned position.

The complementary formed surface portions are configured to limit the relative movement between the plates to rotational movement about an axis. The axis extends through the aligned openings or is otherwise in substantially horizontal alignment with the aligned openings.

One of the openings is eccentrically disposed relative to the axis and has a cross section shaped to interface with the pin so that the pin moves with the first opening. A second of the openings in the other of the plates is larger than the first opening. Thus, the position of the axle relative to the frame can be adjusted by loosening the pin, rotating the first plate relative to the second plate, and tightening the pin.

In one aspect of the invention, the mutually complementary formed surface portions comprise an annular rib on one of the plates and an annular groove on the other of the plate with the annular rib being nested within the annular groove. Preferably, the annular rib is on the second plate, and the annular groove is on the first plate, and the rib and groove are trapezoidal in cross section. The axis of rotation of the plates is thus centrally located within the annular rib and the annular groove.

Typically, the angle of inclination of the lateral sides of the rib and groove, respectively, is approximately 16° and the rib and groove are dimensioned so that firm contact between the first and second plates in the aligned position is only at the lateral sides.

Preferably, at least one connection is between the trailing arm and a frame bracket which is fixed to the vehicle frame.

In another aspect of the invention, the first plate has an aperture with a diameter substantially the same as the diameter of the pin, and the second plate has an aperture larger than the diameter of the pin. The pin extends through the first plate aperture and the second plate aperture. Preferably, the second plate aperture is generally semicircular.

In yet another aspect of the invention, the pin is a hex head bolt, and the first plate has an annular hexagonal seat on the surface opposite the annular groove to receive the bolt head. In a further aspect of the invention, the first and second plates are identified, respectively, as an alignment block and an alignment plate. The distal end of the bolt extends through a second set of plates identical to the alignment plate and alignment block and is secured by a nut. Preferably, the end of the bolt has a flat, and a lock washer having a complementary flat is disposed on the end of the bolt and seated in a seat in the corresponding alignment block so that during rotation of the alignment blocks relative to their respective alignment plates, the bolt will be maintained in a position normal to the axis of alignment.

BRIEF DESCRIPTION OF THE DRAWINGS

The invention will now be described with reference to the accompanying drawings in which.

DETAILED DESCRIPTION

Figure 1:
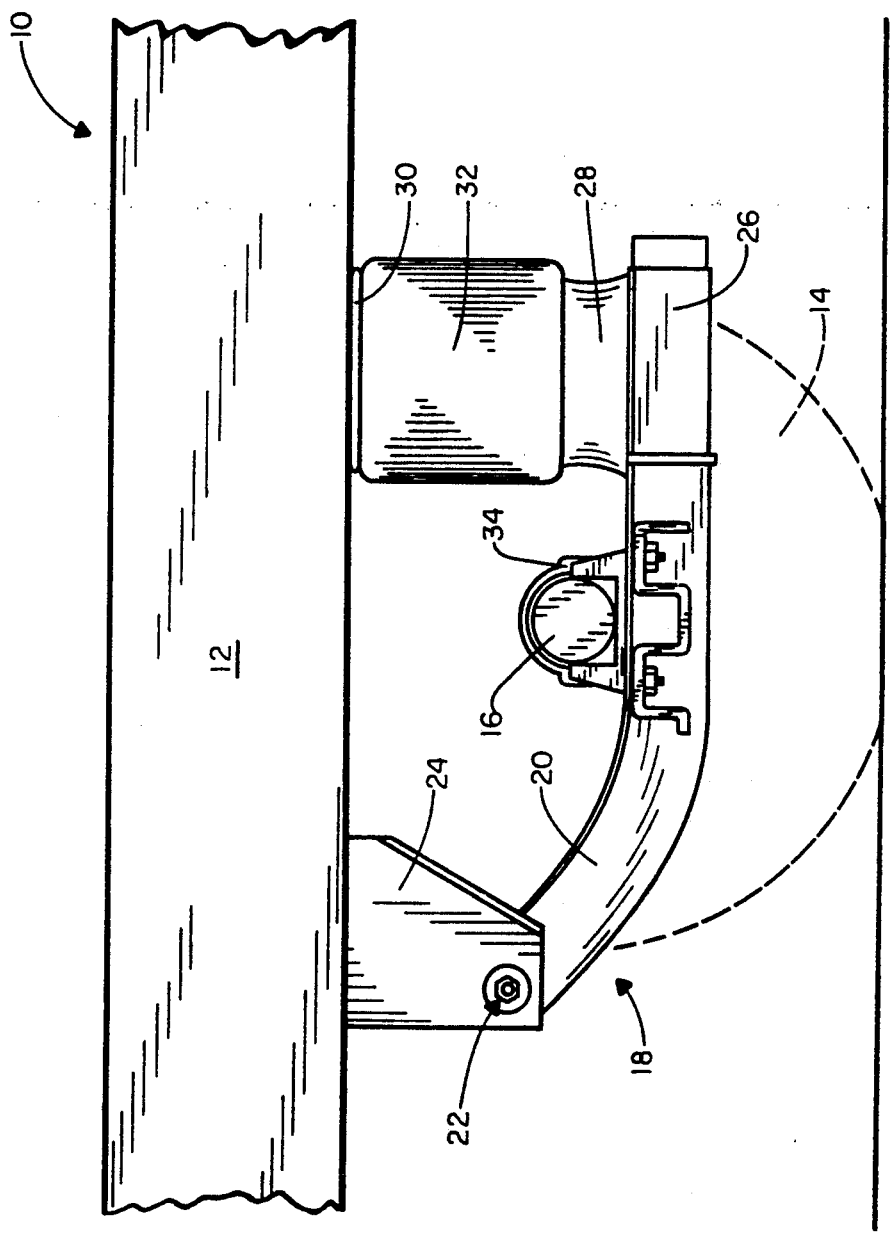
FIG. 1 is a fragmentary, generally side elevational view of a vehicle suspension incorporating the present invention.

Represented in FIG. 1 is a vehicle 10 having a frame 12 from which ground-engaging wheels 14 mounted on an axle 16 are suspended by a suspension 18. In general, the suspension 18 includes at each side of the vehicle 10 a trailing control arm 20 mounted to the frame 12 by a pivotal connection 22 in a hanger bracket 24 affixed to the frame. The control arms 20 swing vertically about the pivotal connections 22 which are substantially coaxial. Each control arm 20 has a free end portion 26. Frequently the free ends 26 are connected to each other by a transverse beam (not shown). A piston 28 is mounted at the free end 26 of each control arm 20 either on the control arm, or on the transverse beam. The frame 12 is provided with a mounting plate 30 spaced upwardly from each piston 28, and an air spring 32 is disposed in load transmitting relation between the piston 28 and the mounting plate 30. The axle 16 is connected to and between the control arms 20 by axle brackets 34.

Figure 2:
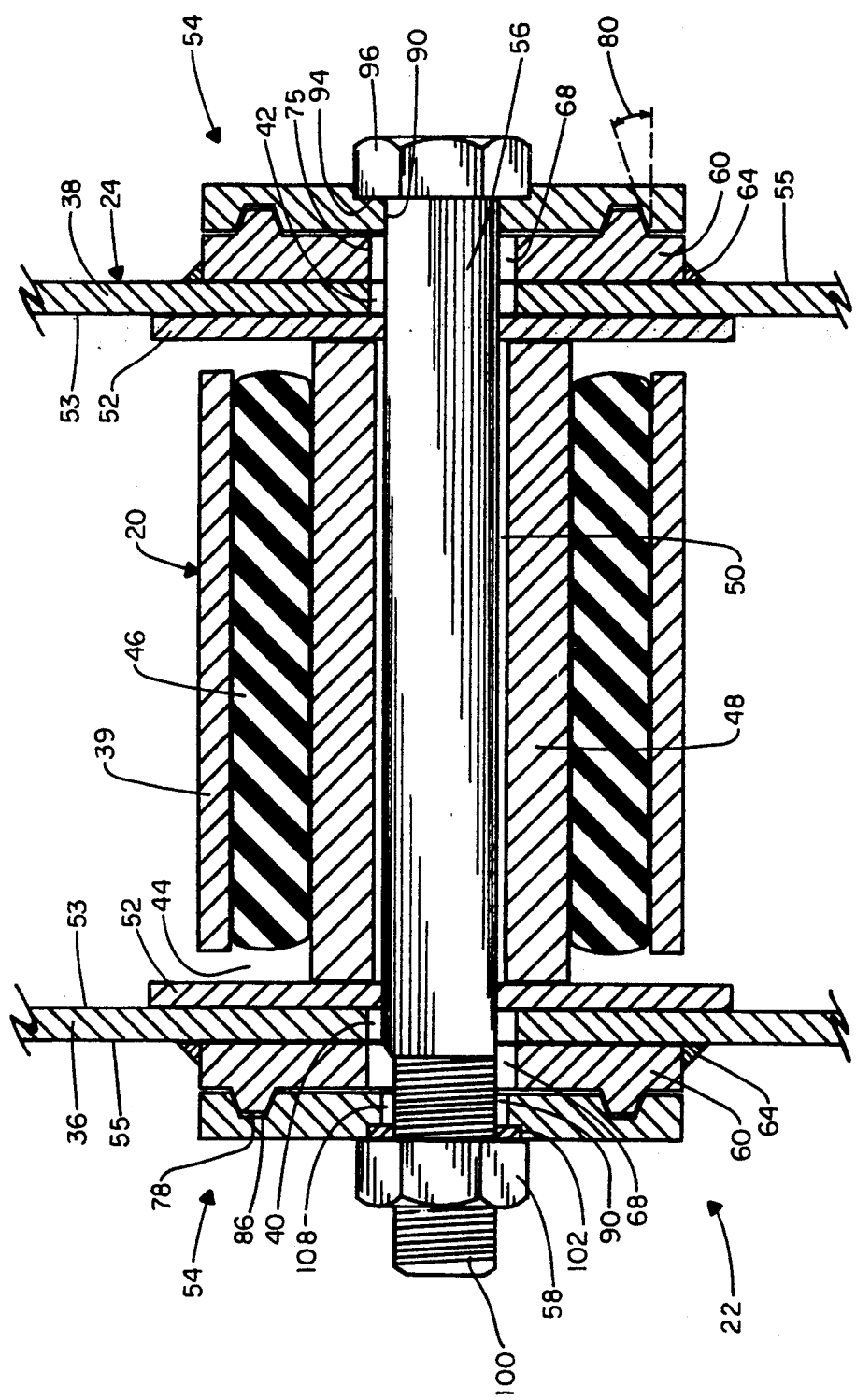
FIG. 2 is an enlarged sectional view taken along line 2—2 of FIG. 1.

Referring now to FIG. 2, each hanger bracket 24 has two laterally spaced walls 36, 38 between which the pivoted end 39 of one control arm 20 is disposed. The walls 36, 38 are provided with aligned openings 40, 42, respectively. The pivoted end portion 39 of the control arm 20 has an opening 44 within which is press-fitted a torsion bushing 46 of elastomeric material such as rubber. The inner surface of the bushing 46 is bonded to a metal core sleeve 48 having a throughbore 50 which, for assembly, is axially aligned with the hanger bracket openings 40, 42. Washers 52 are disposed between the inner faces 53 of the bracket walls 36, 38 and the end portion of the control arm 20 in alignment with the openings 40, 42, and 50. A pair of alignment assemblies 54 are engaged against the outer faces 55 of the hanger bracket walls 36, 38. The entire pivotal connection 22 is secured by a pin in the form of a bolt 56 on which a nut 58 is threaded. The bolt extends through the alignment assemblies 54 as will be discussed hereinafter, and through the axially aligned hanger bracket wall openings 40, 42 and throughbore 50.

Each alignment assembly 54 comprises an alignment plate 60 and a corresponding alignment block 62. An alignment plate 60 is rigidly and fixedly secured to the outer surface 55 of each hanger bracket wall 36, 38 by weldments 64.

Figure 3:
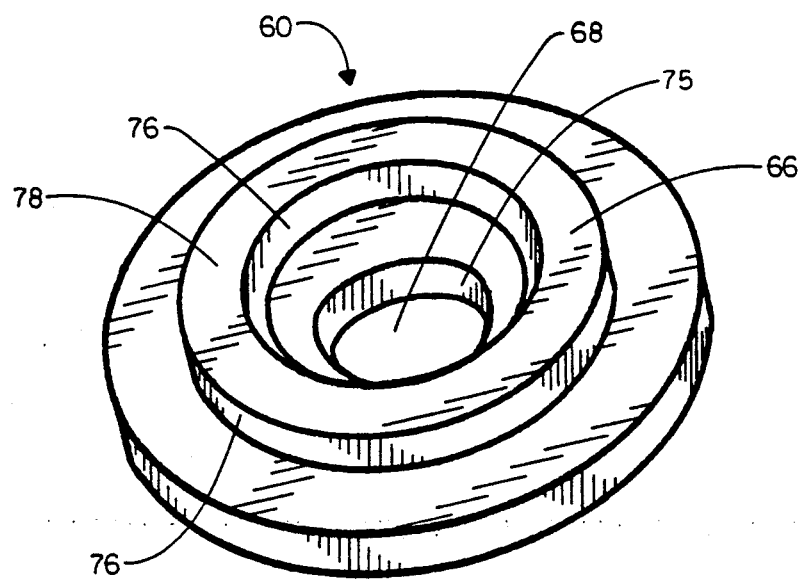
FIG. 3 is a perspective view of the alignment plate used in the alignment mechanism of FIGS. 1 and 2.
Figure 4:
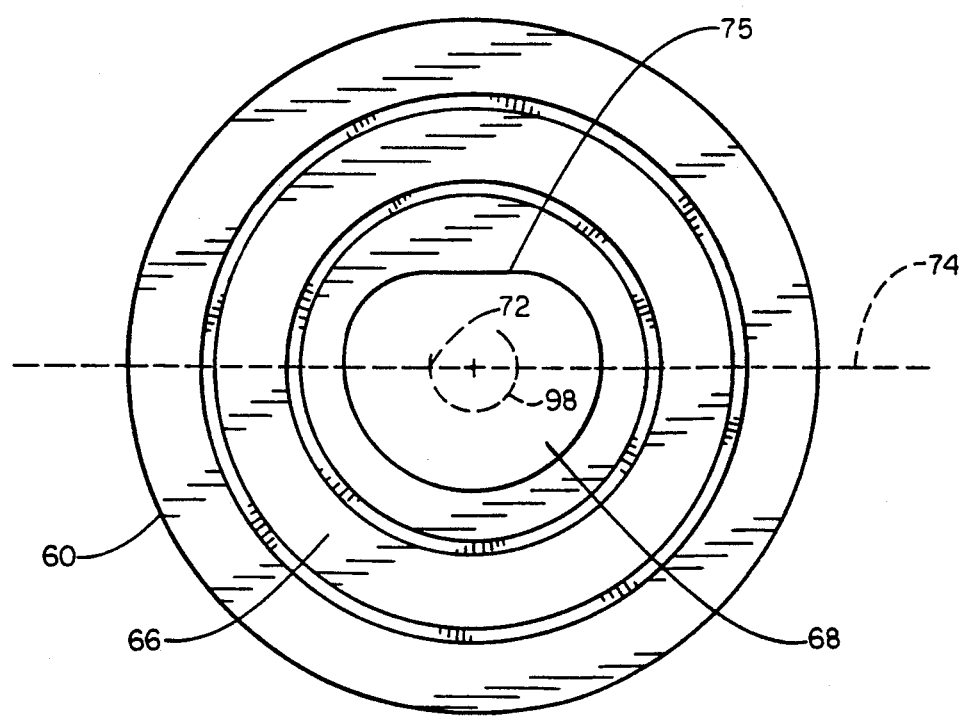
FIG. 4 is a plan view of the alignment plate of FIG. 3.

Looking now at FIGS. 2 through 4, it can be seen that the alignment plate 60 is essentially a disk having on one of the flat surfaces thereof a raised annular rib 66. A D-shaped or roughly semicircular opening 68 extends through the alignment plate 60 within the circumference of the annular rib 66. The opening 68 is eccentric relative to the center 70 of the disk. In other words, the center 70 serves as an origin for the radius of one-half of the opening 68. A pair of foci 72 are disposed on an imaginary line 74 in a plane of the alignment plate 60 and extending through the center 70. As will be discussed more fully hereinafter, the alignment plate 60 is secured to the outer surface 55 in a position whereby the imaginary line 74 will coincide with the fore and aft direction of the wheel alignment. Preferably, each focus 72 is spaced approximately one-quarter of an inch from the center 70 of the disk. The edge 75 of the nonsemicircular portion of the opening 68 is defined by a radius having its origin at each of the foci 72, with the length of the radius being substantially equivalent to the radius of the shank of the bolt 56.

The annular rib 66 is trapezoidal in cross section, having two lateral faces 76 and a top face 78. The lateral faces 76 each have an angle of inclination 80 relative to the surface of the alignment plate of approximately 16°.

Figure 5:
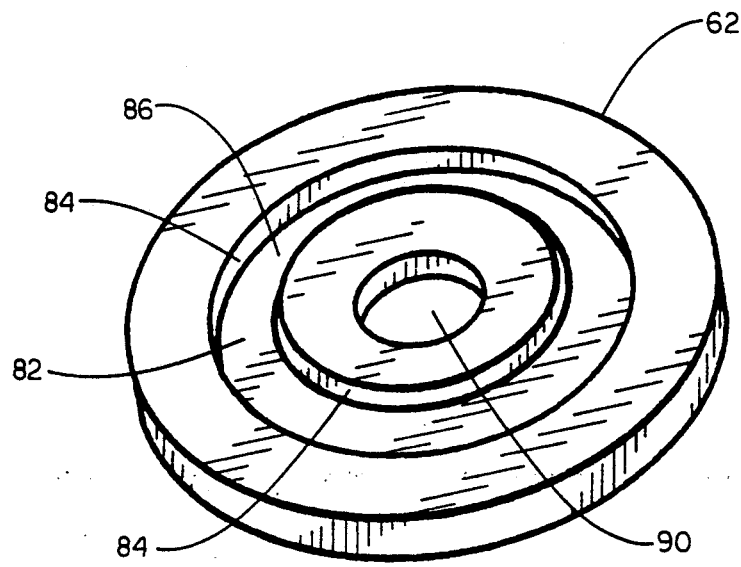
FIG. 5 is a perspective view of the alignment block utilized in the alignment mechanism of FIGS. 1 and 2.
Figure 6:
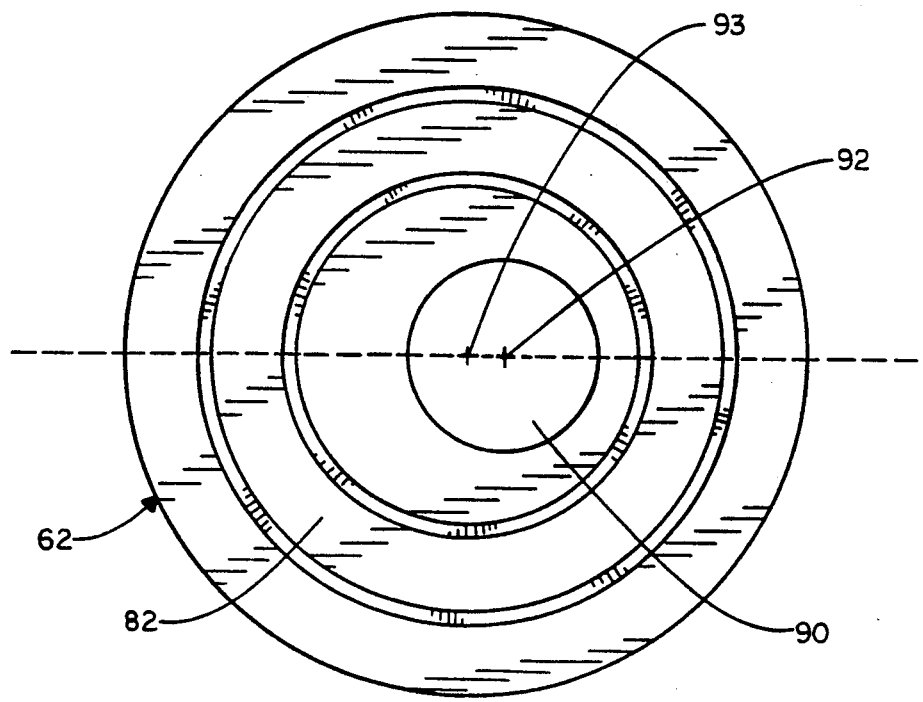
FIG. 6 is a plan view of the alignment block of FIG. 5.
Figure 7:
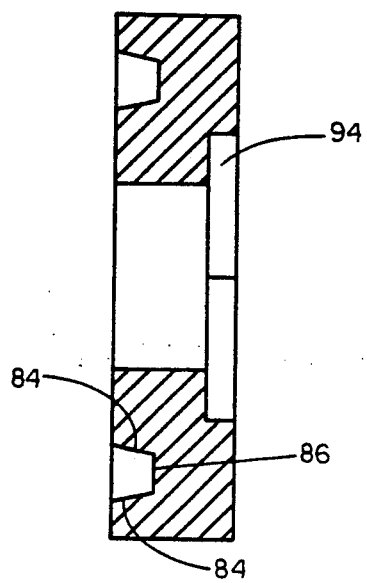
FIG. 7 is a sectional view taken along line 7—7 of FIG. 6.
Figure 8:
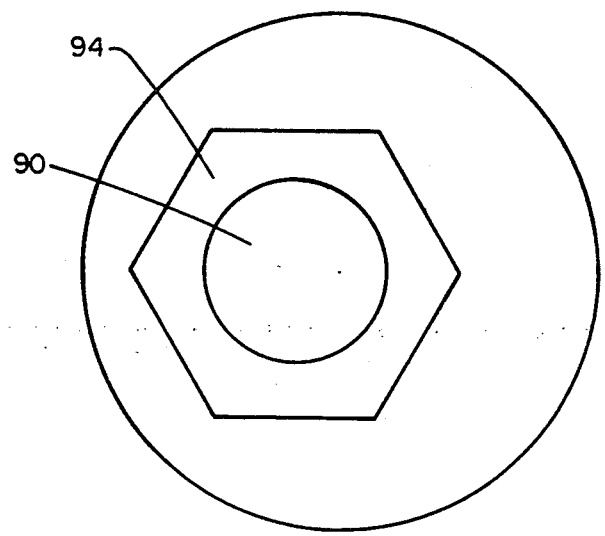
FIG. 8 is a plan view of the alignment block of FIGS. 6 and 7 taken along line 8—8 of FIG. 7.

Referring now to FIGS. 5 through 7, it can be seen that the alignment block 62 is essentially a disk having an outer circumference substantially the same as that of the alignment plate 60. An annular groove 82 is disposed in one surface of the alignment block 62. In cross section (see FIG. 7), the groove 82 is substantially trapezoidal, having roughly the same shape as the annular rib 66. The groove 82 thus comprises lateral faces 84 and a bottom face 86. The angle of inclination of the lateral faces relative to the surface and the bottom face 86 is approximately 16°, identical to the angle of inclination 80.

A circular aperture 90 extends through the alignment block 62 and is disposed within the circumference of the annular groove 82. The aperture 90 has a longitudinal axis 92 which is offset from the axis extending through the center 93 of the disk. Preferably, it is offset a distance of one-quarter inch. The diameter of the aperture 90 is substantially the same as the diameter of the bolt 56. An annular hexagonal seat 94 is disposed in the opposite surface of the alignment block 62 around the aperture 90 for a purpose to be described hereinafter.

Looking again at FIG. 2, it can be seen that the alignment block 62 is disposed adjacent the alignment plate 60 so that the annular rib 66 is received in the annular groove 82. Thus disposed, it will be seen that the alignment block 62 is rotatable about an axis 95 extending through the center 70 of the alignment plate 60 and the center 93 of the alignment block 62. Preferably, the annular rib 66 will be dimensioned so that when the alignment block 62 is mounted to the alignment plate, it is carried thereon only by the lateral faces 76, 84. In other words, the surfaces of the alignment plate 60 and alignment block 62 do not touch, and the top face 78 is spaced from the bottom face 86. It is important that the angle of inclination 80, 88 be close to the locking angle wherein the alignment block 62 would be locked on the alignment plate if axial pressure were directed along the axis 95 to press the plate 60 and block 62 together. The locking angle is estimated to be approximately 16°.

It can be seen that when the alignment block 62 is so disposed on the alignment plate 60, the aperture 90 and the D-shaped opening 68 can receive the bolt 56. The bolt head 96 is configured to be seated in the hexagonal seat 94. The bolt 56 extends through the opening 40 in the hanger bracket arm 36, through the throughbore 50, through the other opening 42, and thence through the D-shaped opening 68 and the aperture of the other alignment plate 60 and alignment block 62, respectively.

It can be seen in FIG. 4 that as the alignment block 62 carrying the bolt head 96 rotates about the longitudinal axis 95, which is coincident with centers 70 and 93 of the alignment plate and alignment block, respectively, the bolt 56 will move along a semicircular arc 98 to and between the foci 72. Movement of the bolt 56 along the arc is restricted to a semicircle because movement of the bolt in the other direction is inhibited by the flattened edge 75 of the D-shaped opening 68. From the view of FIG. 2, it can be seen that the longitudinal axis 99 of the bolt 56, which is coincident with the center 92 of the aperture 90 in the alignment block 62, will be offset from axis 95 when the bolt is anywhere between the foci 72. This rotational movement results in a slight vertical displacement of the trailing arm end 39 relative to the frame 10, but the amount is no greater than 0.25 inches and not noticeable in the vehicle.

Figure 9:
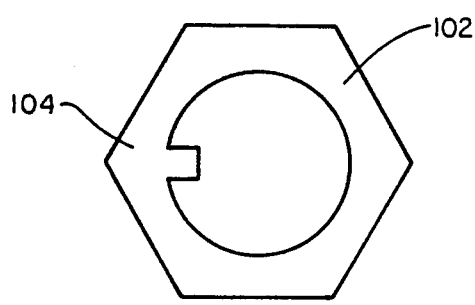
FIG. 9 is a plan view of a first embodiment of a lock washer used in the alignment mechanism of FIGS. 1 and 2.
Figure 10:
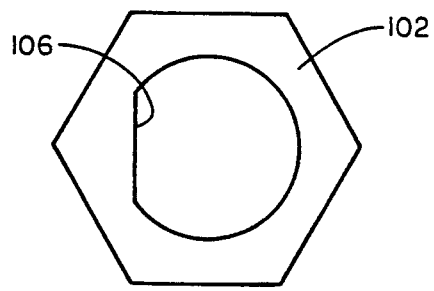
FIG. 10 is a plan view of a second embodiment of the lock washer utilized in the alignment mechanism of FIGS. 1 and 2.

In order to ensure that the other end 100 of the bolt 56 moves along substantially the same path as the bolt head 96, a lock washer 102 is provided as shown in FIGS. 9 or 10. The lock washer 102 is adapted to be seated in the hexagonal seat 94 of the alignment block 62. The lock washer 102 in one embodiment has a tab 104 which is adapted to be received in a keyway (not shown) in the end 100 of the bolt 56. Preferably, a flat 106 in the lock washer 102 is adapted to abut a corresponding flat 108 in the end 100 of the bolt 56. The nut 58 threaded onto the end 100 of the bolt 56 will hold the lock washer 102 in place.

It will be apparent that the alignment of the axle and wheels is adjustable by loosening the bolt 56 and nut 58 sufficiently to permit rotational movement of the alignment blocks 62 relative to the respective alignment plates 60. A wrench or other torque device can be applied to the bolt head 96 to impart a torque to the alignment block 62. The applied torque will cause the alignment block 62 to rotate about the longitudinal axis 95 and thus move the bolt 56 along the semicircle 98 between the foci 72. The distance fore and aft between the foci 72 is preferably one-half inch which has been found to be a sufficient range for complete alignment. It will be understood that a very slight adjustment of the position of the bolt 56 relative to the foci 72 will have a much greater effect on the alignment of the wheels.

Whereas the invention has been described with reference to an alignment mounting between a frame bracket and a trailing arm, a similar alignment can be provided between the trailing arm and the axle bracket 34 in lieu of the frame bracket/trailing arm alignment mounting. In this alternative embodiment, the alignment plate can be welded to the either the axle bracket or the trailing arm.

It will be appreciated that minor variations can be made without departing from the scope and content of the invention. For example, it may be preferable for the openings 40, 42 in the walls 36, 38 to be the same shape and dimension as the D-shaped openings 68 in the alignment plates 60. Alternatively, the aperture in the alignment plate can be circular or the aperture in the hanger bracket can be circular, but at least one such aperture should have the "D-shape". It will also be appreciated that the "D"-shaped opening can be reduced to a semi-annular slot coincident with the arc of travel of the bolt 56 as the alignment block 62 rotates. Similarly, the raised rib 66 and the annular groove 82 can be any shape in cross section, but they should be complementary. These and other reasonable variations and modifications are possible within the scope of the foregoing disclosure without departing from the spirit of the invention which is defined in the appended claims.

The embodiments of the invention in which an exclusive property or privilege is claimed are defined as follows:

1. In a vehicle having a frame with ground-engaging wheels suspended therefrom by two trailing arms, first connections pivotably connecting the trailing arms to the frame at opposite lateral sides thereof for substantially coaxial swinging vertical movement, second connections connecting a wheel carrying axle to and between the trailing arms, and a spring mounted in load transmitting relationship between the frame and the trailing arms, at least one of said first and second connections having first and second plates movable relative to each other, said plates having mutually complementary formed surface portions cooperable for mechanical interengagement and having aligned openings for adjusting the relative position of the axle with respect to the frame, said at least one connection further having a pin extending through the aligned openings in the plates for selectively holding the plates together in the aligned position, the improvement comprising:

the complementary formed surface portions being configured to limit the relative movement between the plates to rotational movement about an axis extending through or in substantially horizontal alignment with the aligned openings; and a first of said openings being eccentrically disposed relative to the axis and having a cross section shaped to interface with the pin so that the pin can move with the first opening, and a second of said openings being larger than the first opening, whereby upon loosening of the pin and rotation of the first and second plates relative to each other, the pin moves about the axis within the second opening, and upon tightening of the pin, the position of the axle relative to the frame is fixed in adjusted position.

2. A vehicle according to claim 1 wherein the mutually complementary surface portions comprise an annular rib on one of the first and second plates, and an annular groove on the other of the first and second plates, said annular rib being nested within said annular groove.

3. A vehicle according to claim 2 wherein the annular rib is on the second plate and the annular grove is on the first plate.

4. A vehicle according to claim 3 wherein the rib and groove are trapezoidal in cross section, each of said rib and groove having inclined lateral sides with the rib having a top surface and the groove having a bottom surface.

5. A vehicle according to claim 4 wherein the angle of inclination of the lateral sides relative to a line normal to the respective plates is approximately 16 degrees.

6. A vehicle according to claim 5 wherein firm contact between the first and second plates in the aligned position is at the lateral sides only.

7. A vehicle according to claim 4 wherein firm contact between the first and second plates in the aligned position is at the lateral sides only.

8. A vehicle according to claim 4 wherein the first of said openings is an aperture in the first plate, said aperture having a diameter substantially the same as the diameter of the pin, and the second of said openings is an aperture in the second plate larger than the diameter of the pin, with the pin extending through the first plate aperture and second plate aperture.

9. A vehicle according to claim 8 wherein the pin is a hex head bolt and the first plate has an annular hexagonal seat on a surface opposite the annular groove to receive the bolt head.

10. A vehicle according to claim 9 wherein the second plate aperture is generally semicircular.

11. A vehicle according to claim 2 wherein the rib and groove are trapezoidal in cross section, each of said rib and groove having inclined lateral sides with the rib having a top surface and the groove having a bottom surface.

12. A vehicle according to claim 1 wherein the first of said openings is an aperture in the first plate, said aperture having a diameter substantially the same as the diameter of the pin, and the second of said openings is an aperture in the second plate larger than the diameter of the pin, with the pin extending through the first plate aperture and second plate aperture.

13. A vehicle according to claim 12 wherein the pin is a hex head bolt and the first plate has an annular hexagonal seat on a surface opposite the annular groove to receive the bolt head.

14. A vehicle according to claim 13 wherein the second plate aperture is generally semicircular.

15. A vehicle according to claim 1 wherein the at least one connection is between the trailing arms and the frame.

16. A suspension adapted to support a vehicle frame on ground engaging wheels, said suspension comprising:

a bracket adapted to be rigidly mounted to the vehicle frame, said bracket having a pair of opposing spaced walls, each wall having an inner surface facing toward the opposing wall, an outer surface opposite the inner surface, and an aperture extending therethrough with the apertures of the pair being aligned;

a trailing arm adapted to be pivotably mounted to the bracket;

an axle for carrying the ground engaging wheels, said axle being mounted to the trailing arm;

an alignment plate fixedly mounted to one of the outer surfaces of the bracket, said alignment plate having an annular rib and a centrally disposed aperture, said alignment plate being positioned on the outer surface so that the alignment plate aperture and wall aperture are aligned;

an alignment block having an annular groove and an eccentrically disposed aperture within the circumference of the annular groove, the annular rib being adapted to be received in the annular groove so that the alignment block is rotatable relative to the alignment plate and the alignment block aperture is in registry with the alignment plate aperture and the wall aperture; and a bolt adapted to extend through the alignment block aperture, the alignment plate aperture, and the arm aperture for pivotably mounting the control arm and securing the alignment block to the alignment plate;

wherein the alignment block aperture is substantially the same diameter as the bolt and the alignment plate aperture and wall aperture are larger than the alignment block aperture so that upon rotation of the alignment block relative to the alignment plate, the position of the bolt and trailing arm relative to the bracket can be changed.

17. A suspension according to claim 16 wherein the alignment plate aperture is generally semicircular.

18. A suspension according to claim 16 wherein a nut is adapted to be threaded onto the end of the bolt to secure the alignment block to the alignment plate and maintain the arm in an aligned position.

19. A suspension according to claim 16 further comprising a second alignment plate fixedly mounted to the other of the outer surfaces, said second alignment plate having an annular rib and a centrally disposed aperture, and being positioned on the other outer surface so that the second alignment plate aperture and arm aperture are aligned;

a second alignment block having an annular groove and an eccentrically disposed aperture with the annular rib being received in the annular groove so that the second alignment block is rotatable relative to the second alignment plate and the second alignment block aperture is in registry with the second alignment plate aperture and the arm aperture, said second alignment block having a seat on a surface opposite the annular groove;

said bolt having an end extending through the second alignment block aperture and the second alignment plate aperture, and a lock washer received on the bolt end and disposed in the seat, said lock washer being adapted to restrict rotation of the bolt relative to the second alignment plate and second alignment block;

whereby upon rotation of the alignment block relative to the alignment plate, the second alignment block will automatically rotate therewith and keep the bolt in a position normal to the axis of alignment.

20. A suspension according to claim 19 wherein the second plate aperture is generally semicircular.

21. A suspension according to claim 19 wherein a nut is adapted to be threaded onto the end of the bolt to secure the alignment block to the alignment plate and maintain the arm in an aligned position.

* * * * *